Patented Oct. 10, 1922.

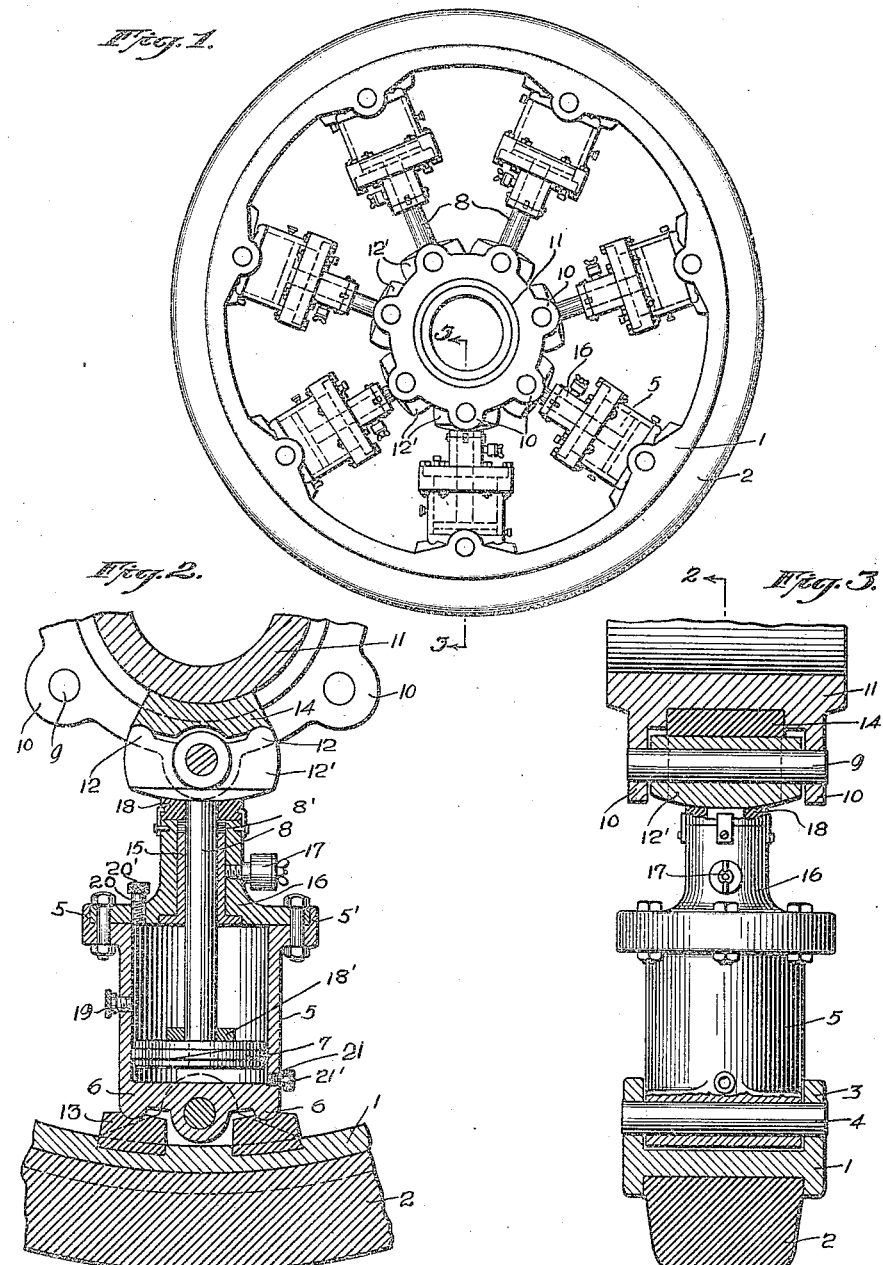

1,431,874

UNITED STATES PATENT OFFICE.

EDWARD COHN, OF NEW YORK, N. Y.

RESILIENT WHEEL.

Application filed December 11, 1920. Serial No. 430,003.

*To all whom it may concern:*

Be it known that I, EDWARD COHN, a citizen of the United States, and a resident of the city of New York, borough of Manhattan, in the county and State of New York, have invented a new and Improved Resilient Wheel, of which the following is a full, clear, and exact description.

This invention relates to a resilient wheel, and has particular reference to an improved wheel of the type in which a cushion of air contained in the cylinder is used to furnish the proper resiliency between the hub and felly of the wheel.

An object of the invention is to provide a simple, efficient and compact structure in which the co-operation of the various parts connecting the hub to the felly of the wheel is effected with a minimum amount of shock to the wheel and wear on the parts.

Another object resides in the particular construction and arrangement of parts hereinafter described and claimed and shown in the accompanying drawings.

My invention, in general, comprises a felly and a hub which are connected together and between which are disposed a plurality of air cylinders having pistons. The pistons are connected to either the hub or the felly, and the cylinders are connected to the felly or the hub, respectively. The connections between the hub and the felly and the cylinders and pistons are pivotal connections, and in the propulsion of the vehicle, by reason of power applied to the hub, in one direction or the other, this pivotal action causes a disturbance of the relative angular position of the piston and cylinder with respect to the hub and the felly. On the piston and on the cylinder, adjacent the hub and the felly, I provide bearing and driving surfaces which assist in the transmission of power between the hub and the felly. I order that the engagement of these driving or bearing surfaces with the hub and felly may not cause too much shock to the wheel and too much wear on the same, I provide resilient cushioning means whereby a positive, firm propelling connection is established but which, nevertherless, eliminates shock or undue wear.

The invention is illustrated in the drawings, of which—

Figure 1 is a side view of the wheel;

Figure 2 is a partial vertical section through one of the cylinders taken on the line 2—2 of Figure 3; and Figure 3 is a partial section taken on the line 3—3 of Figure 1.

As shown in the drawings, the invention comprises a wheel having a felly 1 to which a suitable outer tire of rubber or other resilient material 2 may be attached. This felly is provided at its sides, at intervals throughout its peripheral length, with upstanding flange portions 3 which extend inwardly toward the center of the wheel and are provided with apertures through which bolts 4 are adapted to extend. On these bolts 4 cylinders 5 are adapted to be pivotally supported. The lower head of the cylinder is provided with bearing or driving surfaces or projections 6. The cylinders are each provided with a piston 7 and a piston rod 8 which at its other end is connected to a bolt 9 which, in a manner similar to the bolt 4, is journaled in flange projections 10 formed on opposite sides of the hub 11. Packing material 8' may be located between the rubber cushion 18 and the bearing or bushing 15 described below and prevents air from leaking out of the cylinder 5 and also prevents dust, dirt and water from entering the cylinder and mixing with the grease or lubricant around the piston rod 8. The piston has an enlarged portion adjacent its pivot point which is formed with driving or bearing surfaces 12 on opposite sides of the pivot point. By inspection of Figure 2, it will be observed that only the driving or bearing surfaces 12 of the enlarged portion of the piston rod 8 contact with the resilient cushions 14 described below, the intermediate surface of the cushion being spaced, as shown in Figure 2, from the head portion of the piston rod 8. From Figure 3 it will be noticed that the end portions 12 of the enlarged head portion 12' of the piston rod 8 are of a width equal to the width of the cushion 14, although the intermediate portion may be wider than the cushion 14, as shown in Figure 3. Between the bearing surfaces 6 of the cylinder 5 and the felly 1, a pair of resilient cushions, such as 13, are provided. Similarly, between the bearing or driving surfaces 12 of the piston rod 8 and the hub 11 a cushion of any suitable resilient material 14 is provided. The piston passes through a bearing 15 enclosed within the head 16 of the cylinder. A grease cup or lubricating device 17 is provided to furnish the proper amount of lubrication to the cylinder. At the inner end of the cylinder head or cover 16 a pad of resilient material 18 is provided so that when the piston 7 is in its outermost position the head 12' of the piston will not contact with the metal of the cylinder cover 16 and the piston will not contact with the base of the cylinder 5. In the walls of the cylinder 5 an air inlet valve 19 is provided, as well as air valves 20 and 21. This valve 19 is adapted to permit a certain flow of air into the cylinder as the piston moves inward and outward, the air within the cylinder acting as a cushion between the felly 1 and the hub 11. Valves 20 and 21 are adapted to permit air to escape from their respective air chambers in the cylinder 5 whenever caps 20' and 21' on these valves are removed. These caps are removed only when it is found necessary to take the spoke off the wheel for repairs; otherwise the caps make the cylinder 5 air-tight. Also, by removing these caps, sufficient lubricating material may be introduced through these valves so as to lubricate the piston and the cylinder walls. The cushion 18 is provided to prevent metallic contact between the inner face of piston 7 and the inner end of the cylinder 5, as viewed in Figure 2.

As the hub 11 rotates in one direction or the other under the influence of the power mechanism on the vehicle to which it is connected, it will be noticed that the angular relation of the cylinder and piston with respect to the hub and the felly will vary. This will cause the bearing and driving surfaces 6 and 12 to be disposed in different relations with respect to the hub and felly. The power is transmitted through these surfaces 6 and 12 which engage the felly 1 and the hub 11 through the intermediary of the cushioning blocks 13 and 14 above mentioned.

In Figure 1, the weight of the hub has caused the pistons in the lower cylinders to be somewhat depressed, in the manner shown in Figure 2, whereas the cylinders disposed above the hub 11 at the particular instant shown in Figure 1 are at the opposite end of the cylinders. The air within the cylinders 5 acts as a cushion during the movement of the piston in both directions.

It will thus be observed that I provided a simple and efficient air cushioning device between the hub and felly of a vehicle wheel which is provided with cushioning means disposed between the bearing and driving surfaces and the hub and felly respectively whereby the power may be positively transmitted without shock or jar or wear to the wheel. It will be apparent, also, that minor modifications may be made in the structure and arrangement of the parts without departing from the spirit of the invention.

What I claim is:

1. A resilient wheel comprising a hub, a piston rod pivotally connected to said hub, bearing surfaces disposed on opposite sides of said piston rod adjacent the pivot points, cushions between the bearing surfaces and the hub, a cylinder co-operating with the piston rod, a felly, said cylinder being pivotally connected to said felly, bearing surfaces on opposite sides of the cylinder adjacent the pivot point of the felly, and resilient cushioning means disposed between each of said bearing surfaces and the felly, said cushioning means herein mentioned being used to take up the thrust and form an effective driving leverage between the piston rod, the cylinder and the hub and felly.

2. A resilient wheel comprising a hub and a felly, a piston and cylinder disposed therebetween, the cylinder being pivoted to the felly and the piston pivoted to the hub, a pair of bearing surfaces disposed on opposite sides of the pivot point on the head of the cylinder, a pair of bearing surfaces or lugs disposed on the opposite sides of the pivot point of the piston, and resilient blocks of rubber disposed between these bearing surfaces and the hub and felly whereby the angular position of the piston and the cylinder with respect to the hub and the felly can be varied during the driving of the wheel without undue stress.

3. A resilient wheel comprising a hub and a felly, a flexible spoke connected therebetween and pivoted thereto at each end, bearing driving surfaces disposed on opposite sides of each end of said spoke or connection adjacent the pivot points, and cushioning means disposed between said bearing and driving surfaces and the hub and felly whereby the driving power and thrust between the felly, hub and spoke are effectively cushioned.

EDWARD COHN.